US008612206B2

(12) United States Patent
Chalabi et al.

(10) Patent No.: US 8,612,206 B2
(45) Date of Patent: Dec. 17, 2013

(54) TRANSLITERATING SEMITIC LANGUAGES INCLUDING DIACRITICS

(75) Inventors: Achraf Chalabi, Cairo (EG); Hany Grees, Cairo (EG); Mostafa Ashour, Cairo (EG); Roaa Mohammed, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 853 days.

(21) Appl. No.: 12/633,748

(22) Filed: Dec. 8, 2009

(65) Prior Publication Data

US 2011/0137635 A1    Jun. 9, 2011

(51) Int. Cl.
*G06F 17/21*    (2006.01)
(52) U.S. Cl.
USPC .............................................................. 704/8
(58) Field of Classification Search
USPC ................................................. 704/2–8
See application file for complete search history.

(56) References Cited

U.S. PATENT DOCUMENTS

| 7,595,742 | B2 | 9/2009 | Cozzi et al. | |
|---|---|---|---|---|
| 2006/0089928 | A1 | 4/2006 | Johnson | |
| 2008/0221866 | A1* | 9/2008 | Katragadda et al. | 704/8 |
| 2009/0144049 | A1* | 6/2009 | Haddad et al. | 704/3 |
| 2009/0150140 | A1 | 6/2009 | Cohen et al. | |
| 2009/0157382 | A1* | 6/2009 | Bar | 704/8 |

FOREIGN PATENT DOCUMENTS

WO    WO2009042861 A1    4/2009

OTHER PUBLICATIONS

Beesley, "Romanization, Transcription and Transliteration", retrieved on May 25, 2010 at <<http://www.xrce.xerox.com/Research-Development/Historical-projects/Linguistic-Demos/Arabic-Morphological-Analysis-and-Generation/Romanization-Transcription-and-Transliteration>>, The Document Company—Xerox, 1997, pp. 1-5.
Biadsy, et al., "Improving the Arabic Pronunciation Dictionary for Phone and Word Recognition with Linguistically-Based Pronunciation Rules", retrieved on May 25, 2010 at <<http://acl.eldoc.ub.rug.nl/mirror/N/N09/N09-1045.pdf>>, Association for Computational Linguistics, Human Language Technologies: Conference of the North American Chapter of the ACL, Boulder, CO, Jun. 2009, pp. 397-405.
"Google Transliteration", retrieved on May 26, 2010 at <<http://www.google.com/transliterate/Arabic>>, Google, 2009, pp. 1.

(Continued)

*Primary Examiner* — Abul Azad
(74) *Attorney, Agent, or Firm* — Lee & Hayes, PLLC

(57) ABSTRACT

The present disclosure describes a system and method of transliterating Semitic languages with support for diacritics. An input module receives and pre-processes Romanized character and forwards the pre-processed Romanized characters to a transliteration engine. The transliteration engine selects candidate transliteration rules, applies the rules, and scores and ranks the results for output. To optimize search for candidate transliteration rules, the transliteration engine may apply word-stemming strategies to process inflections indicated by affixes. The present disclosure further describes optimizations as pre-processing emphasis text, caching, dynamic transliteration rule pruning, and buffering/throttling input. The system and methods are suitable for multiple applications including but not limited to web applications, windows applications, client-server applications and input method editors such as those via Microsoft Text Services Framework TSF™.

20 Claims, 5 Drawing Sheets

(56) References Cited

OTHER PUBLICATIONS

Nelken, et al., "Arabic Diacritization Using Weighted Finite-State Transducers", retrieved on May 25, 2010 at <<http://www.eecs.harvard.edu/~nelken/pubs/arabic.pdf>>, Association for Computational Linguistics, Proceedings of Workshop on Computational Approaches to Semitic Languages, Ann Arbor, MI, Jun. 2005, pp. 79-86.

"Onkosh", retrieved on May 26, 2010 at <<http://web.archive.org/web/20080518030049/http://www.onkosh.com/>>, 2010, pp. 1.

"Yamli—Arabic Search Engine and Smart Arabic Keyboard", retrieved on May 26, 2010 at <<http://www.yamli.com/>>, Language Analytics LLC, 2010, pp. 1.

\* cited by examiner

TRANSLITERATING SEMITIC LANGUAGES INCLUDING DIACRITICS

BACKGROUND

A keyboard is the most common way for a user to enter input into a computer. Keyboards comprise a plurality of keys, each of which is associated with the character of a language. Keyboards typically support chording where multiple keys pressed at the same time result in a mapping of another character. For example pressing an "A" on a U.S. English keyboard will result in a lower case "a", but pressing the "A" with a "Shift" key will result in a capital "A". In this way, a user may rapidly enter text into a computer without any omission of characters supported in the user's language.

Different languages have character sets differing in symbols used and symbol frequency. Accordingly, different locales use different keyboards. A U.S. English speaker will preferentially use a U.S. English keyboard and an Arab speaker will preferentially use an Arabic language keyboard.

However, those seeking to communicate in Arabic often do not have access to Arabic keyboards. Rather, they have access to Latin keyboards. Examples include Arab expatriates living in countries where Arabic is not the dominant language, or Arabs working for Western companies where the dominant work language is English.

In those circumstances, users may enter Romanized Arabic, also known alternatively as Arabizi, Arabish and Franco-Arabic, where Latin character sequences are used in lieu of the Arabic character set. For example, "al-walad" is the Romanized Arabic expression for the Arabic word for "child." Romanization exists in many contexts such as pinyin which is a Romanization for Mandarin Chinese.

Computer software is capable of converting Romanized language input into the native character set in a process called transliteration. Many sites presently exist for providing transliteration, including for Semitic languages such as Arabic. Examples include Google™ Labs' Arabic transliteration site html://www.google.com/transliterate/Arabic, Yamli html://www.yamli.com and Onkosh html://www.onkosh.com.

In general, natural languages such as Semitic languages, in particular Arabic, have diacritics, characters that correspond to the Latin short vowels. However, present transliteration technologies do not support diacritics. As a result, those transliteration technologies do not provide output that closely matches the use of the natural language by real-world speakers.

SUMMARY

The present application discloses methods and systems to transliterate Semitic languages including diacritic support. Specifically, the present application discloses a transliteration engine that receives Romanized text, generates candidate transliterations potentially using a transliteration model and at least one language model, scores and ranks the candidate transliterations, and outputs at least some of the candidate. In some embodiments, the n-best candidate transliterations are output.

The transliteration model comprises transliteration rules and rule probabilities. The transliteration model may be generated from a parallel corpus of Romanized words aligned with their non-Romanized counterparts. For example, in Arabic, there would be a parallel corpus of Romanized Arabic words aligned with their corresponding Arabic-script words. An expert rules writer may be used to devise and maintain the transliteration rules in the transliteration model.

The natural language models comprise a word model and a character model. The natural language models may be generated from a natural language corpus.

The transliteration engine and associated components may be hosted on a standalone system or on a distributed platform such as a client-server configuration.

The methods used in the transliteration engine include but are not limited to optimizations such as selecting candidate transliteration rules, word-stemming, pre-processing/post-processing emphasis text, caching, pruning transliteration rules dynamically during run time processing, and buffering/throttling input.

The transliteration engine may be hosted in a wide range of applications including but not limited to web applications, windowed applications, and input method editors. Methods of hosting include but are not limited to distributing the transliteration engine as a dynamic linked library, a static library, a component object model component, and a .NET™ component from Microsoft™ corporation.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following figures. In the figures, the left-most digit(s) of a reference number identifies the Fig. in which the reference number first appears. The use of the same reference numbers in different figures indicates similar or identical items or features.

DETAILED DESCRIPTION

Introduction

This application discloses transliterating Romanized text of a natural language into the natural language's native character set, including diacritics. Specifically, the embodiments disclosed in this application provide diacritized transliteration by application of a rules-driven transliteration engine that calculates the probabilities of diacritized output and displays the output candidates with the highest probabilities for choice by a user. Accordingly, a user or process may input Romanized text and will receive correctly transliterated text in a natural language with the correct diacritics incorporated.

Illustrative Architecture

Figure 1:
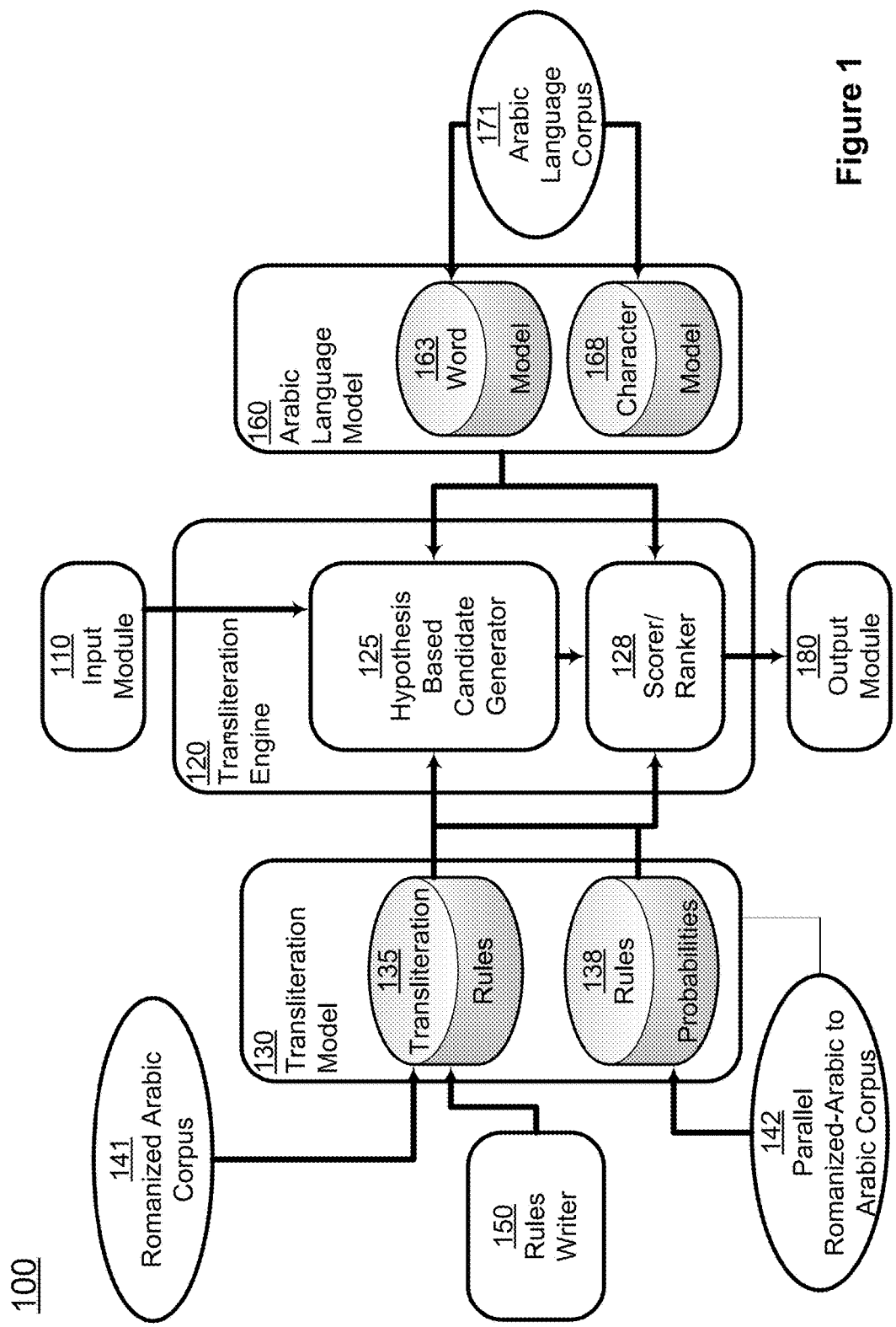
FIG. 1 illustrates an illustrative architecture block diagram of a transliteration engine and associated components.

FIG. 1 illustrates an illustrative architecture for a transliteration engine and associated components. Specifically, a user inputs Romanized text into a control on-the-fly or pre-entered Romanized text is forwarded to an input module 110. For example, a user may enter Romanized Arabic text from a Latin keyboard into an internet chat client. The internet chat client may either directly incorporate the transliteration engine, or may forward the Romanized Arabic text to the transliteration engine in component form. The transliteration engine and associated components would then return the corresponding transliterated and diacritized text in Arabic characters to the internet chat client for the user to read.

Input module 110 passes pre-processed and parsed Romanized text to a transliteration engine 120. Transliteration engine 120 analyzes the pre-processed and parsed Romanized text and develops hypotheses as to what the correct rules to generate correct native character output including diacritics are. Transliteration engine 120 does so by selecting candidate and applying relevant transliteration rules 135, each corresponding to a segment of the input text optionally taking into consideration the rule probabilities 138. Specifically, a transliteration rule provides one possible replacement text for a portion of Romanized text, the replacement text being in the natural language's native character set and diacritized. Since many transliteration rules may seemingly apply, each candidate transliteration rule is contributing in generating one or more hypotheses. Some candidate transliteration rules are more likely to be correct in a context than others. Some candidate transliteration rules initially selected may in fact be not the correct rules to apply. Rules are associated with rule probabilities determined from statistical analysis of a parallel corpus of text, to help indicate how likely a candidate rule would apply.

The transliteration engine then applies the selected transliteration rules and generates candidate transliterated diacritized text. Specifically, the transliteration rule, when applied substitutes the Romanized text with replacement text being in the natural language's native character set and diacritized. While the transliteration engine evaluates whether the correct transliteration rule has been applied, the replacement text is the generated transliterated diacritized text. The candidate transliterated diacritized text may be checked against a set of valid words and character sequences through a language model 160, to determine if the candidate transliterated diacritized text corresponds to a valid text in the natural language.

Specifically, a scorer/ranker 128 of the transliteration engine 120 computes an accuracy score for each candidate by comparing the candidate transliterated diacritized text against valid words 163 and valid character sequences 168 in the language model 160. The transliterated diacritized text candidates are ranked, and the most likely transliterated diacritized text candidates are output in an output module 180. For example, a user might enter, "aghany", the transliteration engine may apply Rule 1, Rule 2, and Rule 3 with three sets of corresponding candidate transliterated diacritized text as, Output 1 "أغني", Output 2 "أغاني", and Output 3 "أغى" respectively. A check against the language model might eliminate Output 3 leaving Outputs 1 and 2. The scorer/ranker may determine that Output 2 is 95% likely to be correct and Output 1 is 30% likely to be correct and thus provide a list of "أغنى" and "أغاني".

Input module 110 receives input in the form of Romanized text, and forwards the input to transliteration engine 120. Optimizing operations by input module 110 are detailed in the discussion around FIG. 5 below.

As an optimization, input module 110 may cache previously processed inputs. Thus, rather than having transliteration engine 120 re-perform transliteration on an identical Romanized text string, the input module may indicate to the transliteration engine 120 to merely output candidate transliterated diacritized text from cache.

Input module 110 may perform pre-processing, to remove emphasis text and other text likely to introduce error in selecting candidate transliteration rules. Example emphasis text includes common interjective tokens such as "smileys", redundant emphatic punctuation such as repeated exclamation points ("!!!!!") and elongation characters like kashidas ("_"). Such interjective text and punctuation are common in short message system (SMS) and internet chat applications, but if not removed, may prevent identification of correct candidate transliteration rules during string comparisons. Accordingly, input module 110 functions to provide textual input to transliteration engine 120 in a form in which transliteration rules may be applied.

For long Romanized text input, input module 110 may risk overwhelming the transliteration engine 120 with input in some instances. Generally, input module 110 requires less processing than transliteration engine 120. Accordingly, input module 110 may include a buffering/throttling feature that prevents input from being forwarded to transliteration engine 120 unless transliteration engine 120 has capacity to process. Transliteration engine 120 may provide a notification to the input module 110 or the input module 110 may affirmatively check transliteration engine 120 for an indicator, such as a flag, that transliteration engine 120 has capacity and, hence, is ready to accept input.

Transliteration engine 120 comprises at least a hypotheses candidate generator 125 and scorer/ranker 128. Candidate generator 125 takes the pre-processed/processed text from input module 110, and identifies candidate transliteration rules from transliteration model 130. Scorer/ranker 128 assigns scores for candidate transliterated diacritized text based on words and character sequences from language model 160.

Transliteration model 130 comprises transliteration rules 135 and transliteration rules probabilities 138. Transliteration rules 135 have a one-to-one correspondence with transliteration rules probabilities 138. Specifically, a transliteration rule might have an absolute probability that it may apply. For example, when a particular portion of Romanized text is detected, several candidate transliteration rules might be selected Accordingly, the candidate transliteration rules might be selected at least in part by selecting the transliteration rules 135 with the highest probabilities 138 of relevance, or alternatively by some predetermined policy.

An example of a predetermined policy might be to select the candidate transliteration rules via brute-force where every possible transliteration rule is selected regardless of the probability that it may apply. One technique to obtain all possible transliteration hypotheses is to traverse the transliteration rules 135 breadth first. In this strategy, the probabilities may be pruned away at run time. Pruning is discussed in more detail in FIG. 4.

Another example would be to set a threshold probability, to determine which transliteration rules should be applied. As transliteration rules 135 is traversed, only rules satisfying the threshold would be applied. In this way, the list of candidate transliteration rules is limited and processing made more efficient.

Transliteration rules 135 are identified from analysis of a representative Romanized text corpus. Upon identification, either via automation or by manual process, a rules writer 150 may be used to create the transliteration rules 135. Statistical analysis of a set of Romanized text and corresponding text in the native character set 142 in parallel yield the probabilities that a portion of Romanized text is mapped to a particular string of native characters. These statistics may be used to populate the transliteration rules probabilities 138.

Language model 160 contains valid words and valid character sequences in the native character set. Accordingly, language model 160 may be used to determine if the candidate transliteration rules are generating valid transliterated diacritized text. Specifically, language model 160 comprises a word model 163 which lists valid words of the natural language in the native character set, and a character model 168 which lists valid sequences of characters in the native character set. Preferentially, the word model 163 comprises single words in the native character set, and the character model 168 comprises tri-grams, or character triplets, in the native character set. Alternatively, the word model could include phrases and proper nouns and the character model might include bi-grams.

Both transliteration model 130 and language model 160 depend on the text corpora used to populate the models. Even within the same natural language, radically different rules and statistics may be generated from different contexts. For example, within Arabic, colloquial Arabic, legal Arabic, Technical Arabic, Ancient Arabic, Named Entities and Religious Arabic all potentially have different transliteration rules and statistics, which can affect the accuracy of transliteration engine 120. Accordingly, based on anticipated input, an appropriate corpus should be used for the Romanized corpus 141, parallel Romanized Arabic-natural language Arabic corpus 142, and natural language corpus 171. Specifically, a corpus is a set of text, usually comprised of a large number of documents, that is used as a statistical representative of the language at large. For example, if the natural language is Arabic, the Romanized corpus 141 is a set of documents that contain Arabic correctly transliterated into Romanized Arabic where the statistics of the text closely match Romanized Arabic at large. Similarly, the parallel Romanized-Arabic to natural Arabic corpus 142 is a set of documents comprising Romanized Arabic texts mapped in parallel to corresponding transliterated Arabic texts, and aligned on word-level where the statistics of the text closely match Arabic at large.

Preferentially based on the ranking by scorer/ranker 128, output module 180 outputs at least one candidate transliterated diacritized text. Output module 180 may provide multiple candidates for a user to select from, or may provide a single candidate. If caching is implemented, the output module may simply provide the cached output based on an indication from the input module. During post-processing, the output module may also restore emphasis text removed by input module 110 during pre-processing.

Illustrative Platforms

Figure 2A:
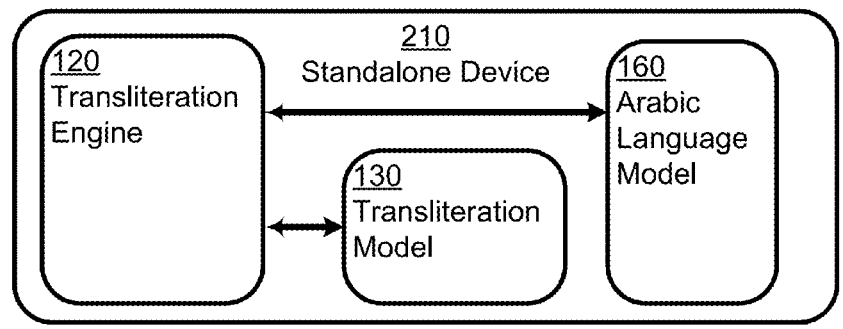
FIG. 2A and FIG. 2B respectively illustrate example standalone and client-server hosting platforms of the transliteration engine and associated components.
Figure 2B:
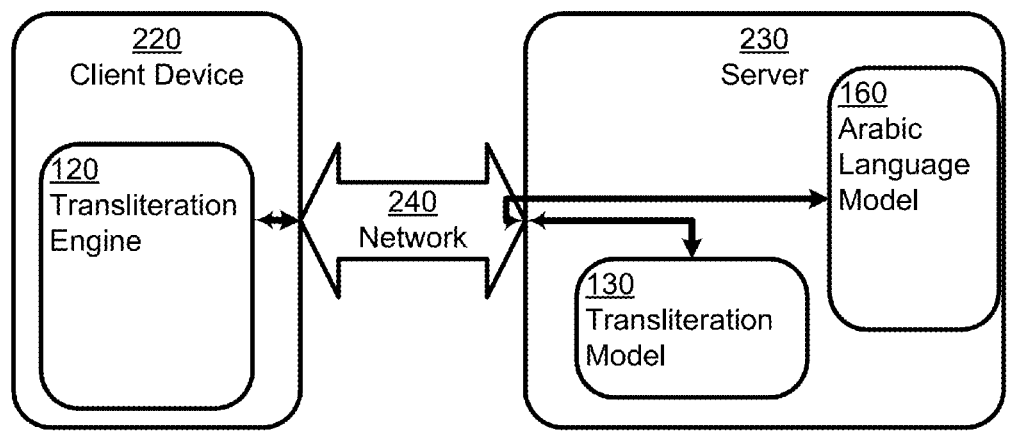

FIGS. 2A and 2B illustrate illustrative platforms on which to host at least the transliteration engine 120 and associated components 130 and 160.

FIG. 2A illustrates hosting the transliteration engine 120, transliteration model 130, and language model 160 on a standalone system. The standalone system may comprise a standard personal device such as a computer ("PC") architecture with one or more processors, each of which with one or more cores. The PC also has random access memory for working memory and a storage, typically a hard disk. The PC preferentially will run an operating system that may host the transliteration engine and its associated components. While this figure illustrates a PC, other implementations may employ any other standalone computing device, such as a laptop computer, a cellular phone, a personal digital assistant (PDA), a set-top box, a gaming console or any other type of computing device.

Present embodiments currently host the transliteration engine 120 implemented for Arabic at 18 Megabytes ("MB"). Well-known compression algorithms have enabled the reduction of the language model by a factor of 10. Accordingly, the present embodiments are well enabled for standalone hosting per FIG. 2A.

In a distributed embodiment, as shown in FIG. 2B, it may be preferably to centralize the transliteration model 130, the language model 160, and the transliteration engine 120 on a server 230. The input module 110 and output module 180 may remain on a client device 220. Both server 230 and client device 220 may have the standard PC architecture as described above and, further, the client PC may comprise any other type of computing device in other implementations, including but not limited to cell phones, netbooks, or any other device that supports a browser or network connection. Server 230 and client PC 220 may be connected via an Ethernet or other standard connection on a local area network ("LAN") or over the Internet. In this way, administrators may update the transliteration model 130, the language model 160 and the transliteration engine 120 without forcing a redistribution of the model to various clients.

FIG. 2B is merely one illustrative configuration for hosting the transliteration engine 120 and associated components 130 and 160. If server 230 is an application server such as Apache Web Server or Microsoft Internet Information Server™, the transliteration engine 120 might be hosted on the server along with transliteration model 130 and language model 160. Additionally, the transliteration engine 120 may feed into the web server and expose itself via hypertext markup language ("HTML") web pages. Server 230 need not be a single server. Alternatively, server 230 may be a disaggregated server in a cloud computing center or a virtual server. Client 220 may be any client that supports a web browser including but not limited to web phones and netbooks.

Application hosting is as diverse as hardware hosting. Transliteration engine 120 may be distributed in various well known formats including but not limited to as a dynamic linked library, a static library, a component object model component, including potentially an ActiveX™ control, and a .NET™ component. Furthermore, functionality may be further exposed as a web service. Distribution may be as an Extended Language Support ("ELS") component within the Microsoft Windows™ operating system.

Since transliteration engine 120 is thereby accessible via the Internet, and because transliteration model 130 and language model 160 may be hosted remotely on a server, the transliteration engine 120 may be supported in web applications, including but not limited to internet messenger/chat, web logs ("blogs"), Twitter™ application, e-mail and the like.

Similarly, the transliteration engine 120 may thereby be invoked as a component or a library, the transliteration engine 120 may be supported in traditional executable applications, including but not limited to standard windowed applications in a graphical user interface environment. In the alternative, a non-UI or console application may also be supported.

If the hosting operating system supports an input method editor ("IME") development framework such as Microsoft Text Services Framework TSF™, distributed with Microsoft Windows™, the transliteration editor 120 may be interfaced with the input method editor which in turn enables consistent integration with applications on the operating system desktop.

Illustrative Operation of the Transliteration Engine

Figure 3:
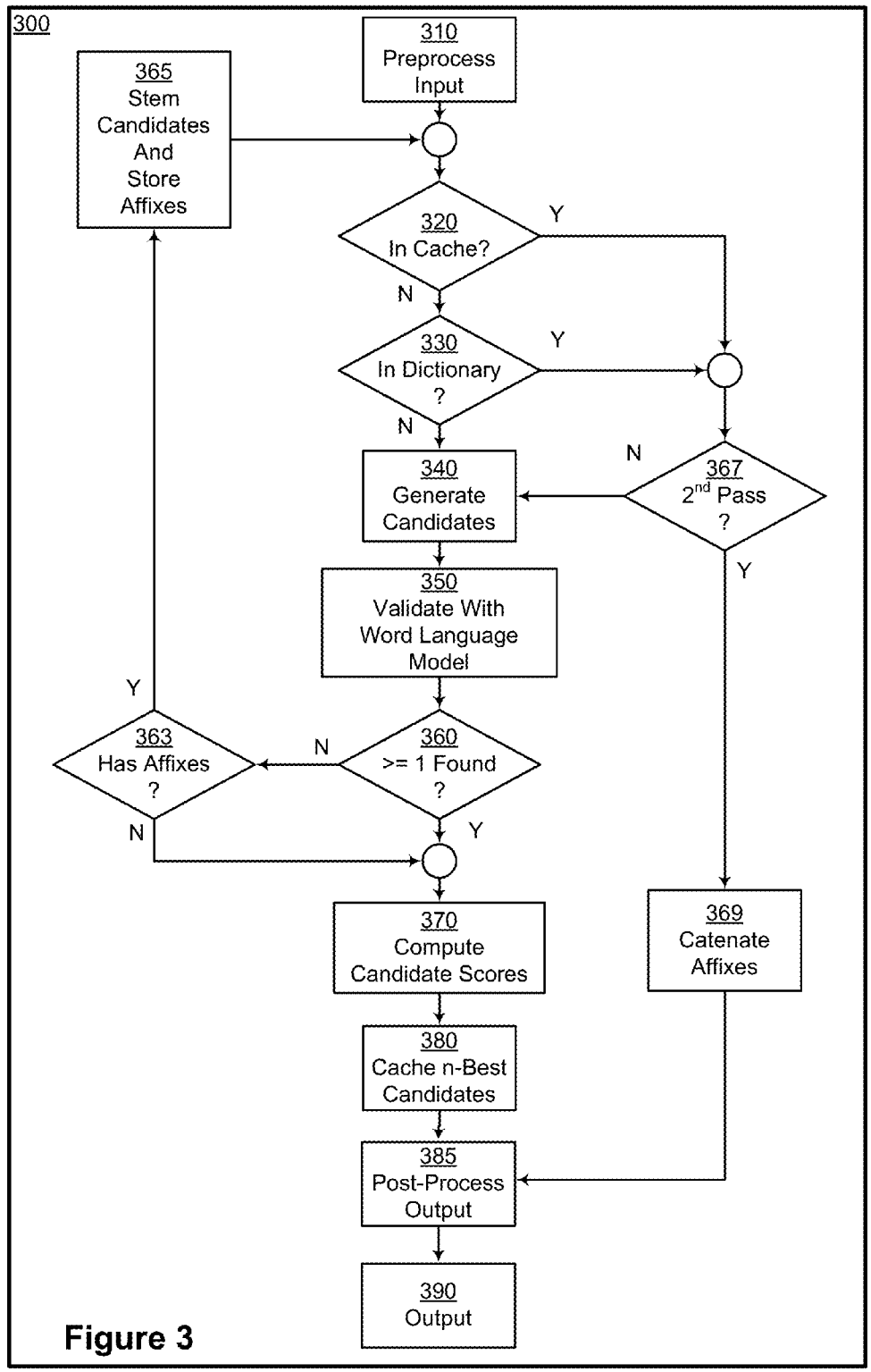
FIG. 3 illustrates a control flow diagram of an illustrative method of operating the transliteration engine, including word-stemming, pre-processing/post-processing, and caching.

FIG. 3 illustrates an illustrative operation of the transliteration engine 120. The transliteration engine serves to receive Romanized text, generate candidate transliterated diacritized text in native characters corresponding to the receiving Romanized text 340, score and rank the candidate transliterated diacritized text 370, and output at least some subset of candidate transliterated diacritized text 390.

Additionally, the transliteration engine supports optimizations including but not limited to caching 320 and 380, pre-processing 310 and 385, and word-stemming lookup 363, 365, 367 and 369. These optimizations are preferentially implemented at least partially in the input and output modules 110 and 180.

Operation begins upon receiving Romanized text. Prior to transliteration, the portion of the text most likely to suggest a transliteration rule is extracted. Transliteration rules may be stored as a lookup table where each record may contain the following entries:
 a. Number—Unique identifier for the rule
 b. Source—String of Romanized input text
 c. Target—Natural language text in native characters, including diacritics, that corresponds to the String of Romanized text input
 d. Constraints—Constraints to the rule applicability stating which part of a word or what context the rule may apply to (e.g. Initial, Middle, Final, Preceded By)
 e. Probability—Likelihood, based on a statistical analysis of a corpus of parallel text, that a rule might apply; used to weight application of a rule
 f. Example—Example text showing an application of the rule, to aid in editing and maintaining the rule
 g. Labels—A name for the rule, also to aid in editing the rule Accordingly, a rule operates as a text replacement routine with constraints. If the source text is not identified in the Romanized input text, with the appropriate constraints satisfied, then the rule is not selected. However, natural language text, including Romanized text generally contains extraneous characters preventing the application of a rule. To this end, pre-processing and word-stemming apply.

When Romanized text is sent to the input module 110, it is pre-processed in 310 where the Romanized text is first stripped of emphatic text such as smileys (e.g. ";-)") and repeated exclamation points (e.g. "!!!!"). Such emphatic text is common in internet chat. The input module parses the text, identifies known smileys, emphatic punctuation and other decorative text such as elongation marks, and stores the emphatic text and the location thereof. This information will be used later in post-processing 385 to restore the emphatic text.

The pre-processed Romanized text is then compared to cache 320. Cache stores a lookup table for source Romanized text paired with transliterated diacritized text created from prior processing. If the source Romanized text is found, the transliterated diacritized text is retrieved from cache, and any affixes that had been removed in 365 are restored in 369 by transliterating the affixes and placing the transliterated affixes in their original locations. and post-processing 385 is performed to restore removed emphatic text. Otherwise, processing proceeds to 330.

In 330, the pre-processed Romanized text is then compared to a dictionary of Romanized text based on a corpus of Romanized text 141. The dictionary generally only includes the stem words. Thus the pre-processed Romanized text is found in the dictionary and the word stem is identified.

Word-stemming is important in reducing the number of rules to be stored. A limited set of rules may apply to a word stem and some number of permutations of affixes. An English example of word-stemming is as follows. The entered pre-processed text may be the word "reproduced." Removing the prefix "re" yields the word "produced." Removing the suffix "ed" and performing a grammatical correction yields the word stem "produce." The same set of rules might apply to the word stem "produce", the past tense "produced", the prefixed present tense "reproduce", and the prefixed past tense "reproduced." In some Semitic languages such as Arabic, affixes are key to producing inflections, and in real-world use, Arabic is a highly inflected language. Accordingly, word-stemming is an important strategy to produce transliteration that matches real-world use, at minimum computation cost.

If a word stem has been identified, processing proceeds to 367 which will be discussed below.

Alternatively, if the word is not found in the dictionary, then the algorithm will rely on applying candidate transliteration rules in 340.

In 340, given pre-processed Romanized text, the rules are scanned for source text that matches the constraints. A probability threshold may be predetermined to determine whether or not a rule should apply. The rules that are to be applied are candidate transliteration rules. In some embodiments, each matching rule may be retrieved. Alternatively, a cap of rules, for example only rules yielding to a maximum of the five best highest probability transliteration hypotheses may be selected for application. Yet another alternative is to make use of the grammatical context and dynamically determine a cap. The discussion in FIG. 4 describes pruning candidate transliteration rules in order to aid performance.

Upon selecting candidate transliteration rules, in 340 the rules are applied, that is the source Romanized text is replaced with the target text specified in the rules. This yields one or more candidate transliterated diacritized texts.

In 350, the candidate transliterated diacritized texts are scored through the language model. The overall score is calculated as a weighted combination of the individual scores computed through each of the 3 models, namely the transliteration model, the word-level language model and the character-level language model.

In 360, if one or more candidate transliterated diacritized texts have been generated, then processing can continue to 370. However, if no one of the generated candidates has been found in the word-level language model, the algorithm would determine if no word stem could have been detected through stripping affixes 363.

A preferential word-stemming strategy is to perform two passes. In a first pass the word stem is identified by removing affixes. In the second pass, the affixes are re-catenated to the word stem after candidate transliteration rules have been identified. Accordingly, in 363, if there are affixes, the affixes are removed in 365, stored for later restoration, and processing returns to 320. Since the affixes have been removed, the word stem might be detected in the dictionary in 330 and processing returns to 367. If in 367 it is determined that a second pass has been performed, that is the affixes have been removed, then candidate transliterated diacritized texts have been identified, and the affixes stored from 365 need only be restored in 369. Otherwise, if it is only the first pass, processing resumes at 385.

In 370 based on input from the language model 160 and the rule probabilities a confidence score is calculated for each candidate transliterated diacritized text. The n-best are cached in 380.

The scoring mechanism is a weighted combination of different models. An example might be a transliteration engine with three models: a character model, a word model, and a transliteration model. Each model would generate its own accuracy score. The accuracy scores could be combined into a single accuracy score using weights. Tuning scoring would also provide experimental data as to which models weights provided the best results.

Finally in 385, during post-processing, the emphasis text removed during pre-processing 310 is restored, possibly in the output module. The post-processed candidate transliterated diacritized text is presented to the user or otherwise output in 390.

Illustrative Operation of the Transliteration Rules Pruning Algorithm

Figure 4:
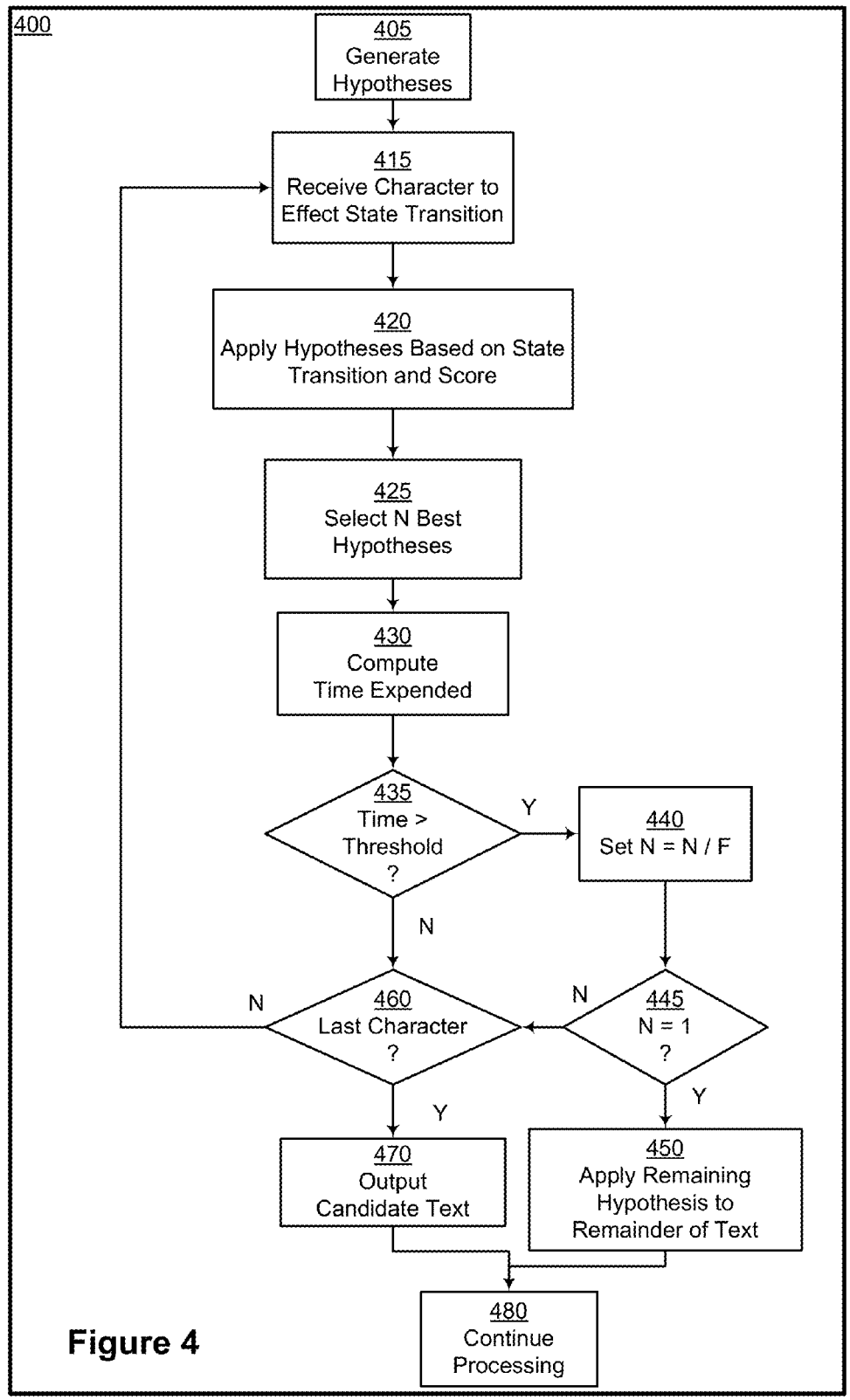
FIG. 4 illustrates a flow diagram of an illustrative method to optimize the transliteration engine via dynamic, run-time transliteration rules pruning.

The transliteration engine 120 is performant for substantially real time applications such as internet chat. For example, the rules processing, identification of candidate transliterated diacritized text, scoring and ranking all may be performed on-the-fly while user is engaging in a chat-like session. Experimental data suggests that user satisfaction is greatest when transliteration processing completes in approximately 20 milliseconds/word. In this environment, a strategy to improve performance is to only perform processing on the rules most likely to yield correct transliterated diacritized text. An embodiment of the transliteration engine 120 is to prune the candidate transliteration rules dynamically during run time and thereby limit processing to only the most likely transliteration rules. FIG. 4 describes an illustrative operation of such a dynamic transliteration rules pruning algorithm.

Item 405 corresponds to portion in item 340 in FIG. 3 where candidate transliteration rules are identified. Initially, in 405, a relatively large number of hypotheses and corresponding candidate transliteration rules are identified. This increases the chances that the correct transliteration rule is later selected.

Per item 415, processing occurs on a per character basis. As each new character is processed, the list of likely applicable candidate transliteration rules lowers. Specifically, when parsing characters, the pruning algorithm expects a subset of subsequent characters each representing valid input. These expectations are stored in a state machine. Accordingly, each new character-rule pair triggers a state change. In 420, based on the state change, candidate transliteration rules are applied to the characters entered so far. Accuracy scores are calculated on the fly.

After scoring, in 425, the N best candidate transliteration rules are chosen. These N candidate transliteration rules will be the rules where processing continues. The N+1 and greater rules are thus pruned from further processing, saving computing resources. N initially starts as a relatively large number, but as will be seen, N may monotonically reduce to 1 in some instances.

After scoring, the absolute time thus expended is calculated 430. If the absolute time is greater than a preset threshold 435, then N is reduced by some factor F 440. For example, if N is 12 and F is 2, N is set to 6, thereby further reducing the number of candidate transliteration rules to be processed in 425. In fact, if N reduces to 1, in 445 only the $1^{st}$-best rule will be selected for each new character till the remainder of the text, and as long as no terminating character has been encountered.

The input buffer is checked to see if it is the last character. If it is, there will be no further state changes to aid in reducing candidate transliteration rules. The different candidate text is then output 470 and processing continues in 480.

If the last character has not yet been received in 460, processing returns to 415 to receive the next character.

Illustrative Operation of the Input Module Buffer/Throttle

Figure 5:
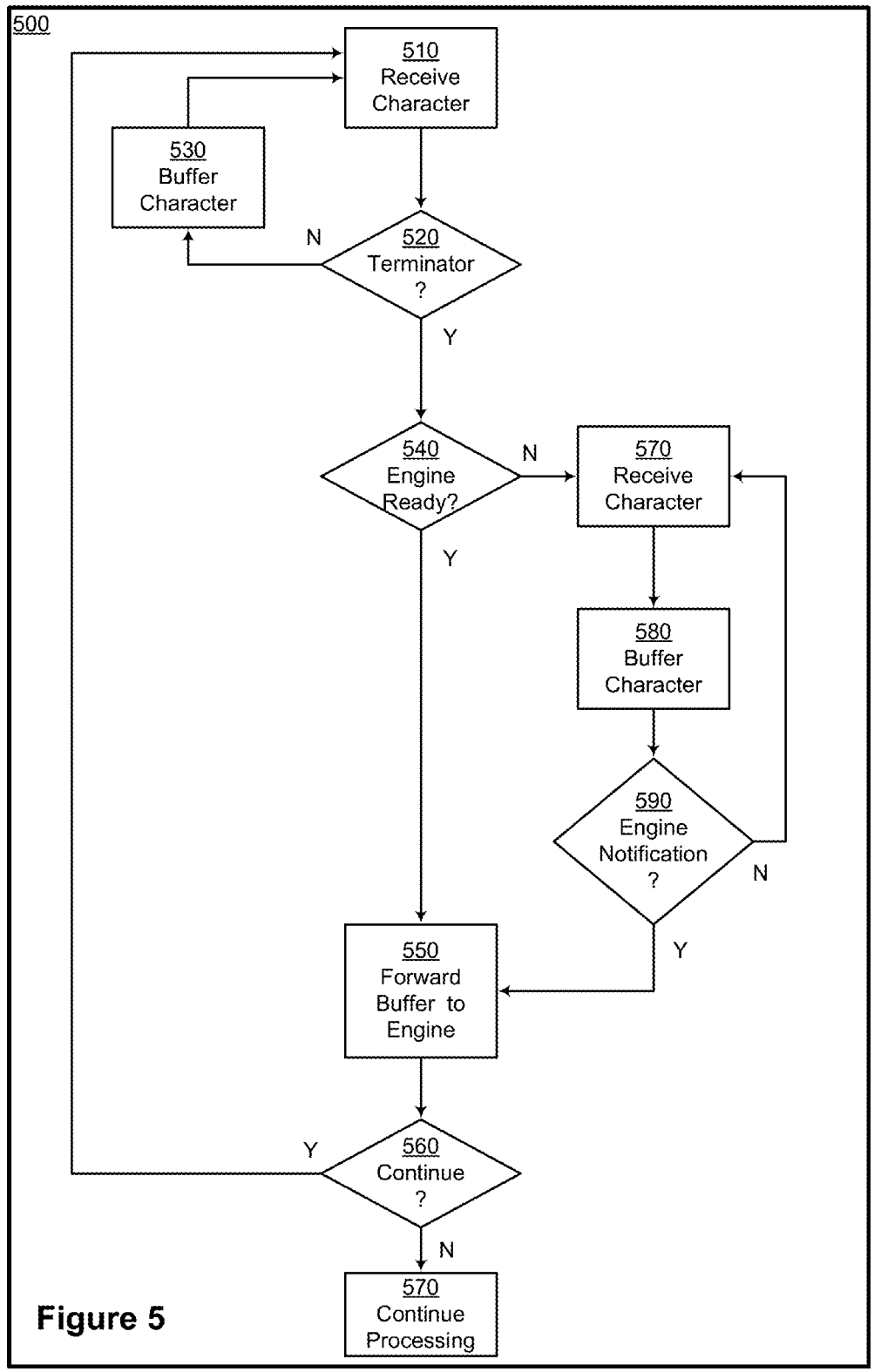
FIG. 5 illustrates a flow diagram of an illustrative method to optimize the transliteration engine via buffering/throttling input into the transliteration engine.

Processing between input module 110 and transliteration engine 120 may be separated because the amount of processing used to preprocess input is less than the amount of processing necessary to perform transliteration engine operations. Thus, there is a risk that the input module 110 might provide Romanized text faster than the transliteration engine 120 can handle the processing of such text. Accordingly, an embodiment is to throttle input into the transliteration engine 120 by buffering the input in the input module 110, and to defer forwarding the buffered input to the transliteration engine 120 until some sort of indication of readiness is detected or the transliteration engine sends a notification requesting more input. FIG. 5 illustrates an illustrative operation of the input module buffer/throttle.

In 510, the input module receives a new character. The reception may be via direct user input or may be streamed from another component or application.

If the new character is not a terminating character, the character is buffered in 530. Typically terminating characters are "whitespace" characters including newline, tab, and space. Alternatively, other terminating characters include punctuation such as semicolons and commas. In internet chat, whitespace is typically sufficient.

If the engine is available to process new input 540, the buffer is sent to the engine 550 which processes the Romanized text contained in the buffer, then sends the candidate hypotheses to the output module 565. If the engine is busy, 510 continues to receive characters and buffering them in 530 till the engine gets ready again, or a terminating character is encountered in 520.

When the new character is a terminating character, processing current token is terminated and control is sent back to the input module to process new tokens 570. Typically delimiting characters are "whitespace" characters including newline, tab, and space. Alternatively, other delimiting characters include punctuation such as semicolons, commas, and quotation marks. In internet chat, whitespace is typically sufficient The above description is just one example of potential input module buffering and throttling. Variations such as purging the buffer if a buffer overflow is imminent, or providing error conditions will be appreciated by a person of ordinary skill.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A method of transliterating text, the method comprising:
  receiving a Romanized input text of a natural language that comprises a native character set that includes diacritics;
  setting a threshold probability;
  selecting at least one candidate transliteration rule in response to determining that a probability that the at least one candidate transliteration rule should apply is at least equal to the threshold probability;
  applying each selected candidate transliteration rule to the Romanized input text to transliterate the Romanized input text into at least one corresponding candidate diacritized text in the native character set of the natural language;
computing a confidence score for each candidate diacritized text;
ranking each candidate diacritized text based at least on the computed confidence scores; and
outputting at least one candidate diacritized text based at least on the ranking.

2. The method of claim 1, wherein:
the receiving of the Romanized text comprises pre-processing the received Romanized input text to detect emphasis text in the received Romanized input text, store the detected emphasis text, and remove the detected emphasis text from the received Romanized input text; and
the outputting of the at least one candidate diacritized text comprises restoring the stored detected emphasis text to the at least one output candidate diacritized text.

3. The method of claim 1, wherein the at least one candidate transliteration rule is selected from a transliteration model comprising at least one transliteration rule and a corresponding respective probability that the transliteration rule may apply.

4. The method of claim 3, wherein the selecting of the at least one candidate transliteration rule comprises selecting at least two candidate transliteration rules to apply to the Romanized input text, and further comprising dynamically pruning at least one selected candidate transliteration rule during run time processing of the Romanized input text.

5. The method of claim 3, wherein the natural language is Arabic, and the transliteration model is based at least on a first corpus of text comprised of a set of Romanized Arabic texts and a second corpus of text comprised of a set of Romanized Arabic texts mapped in parallel to corresponding transliterated Arabic texts.

6. The method of claim 1, wherein:
the at least one candidate transliteration rule comprises at least one constraint to limit applicability of the transliteration rule;
the receiving of the Romanized input text comprises:
identifying at least one word from the received Romanized input text; and
extracting a word stem of the identified at least one word by removing affixes from the identified at least one word;
the selecting of the at least one candidate transliteration rule is based at least on the extracted word stem; and
the applying of the selected at least one candidate transliteration rule comprises applying the at least one constraint and the selected at least one candidate transliteration rule to the extracted word stem.

7. The method of claim 6, wherein the outputting of the at least one candidate diacritized text comprises transliterating the removed affixes and reaffixing the translated removed affixes to the transliterated extracted word stem.

8. The method of claim 1, wherein the computed confidence scores are based at least on a language model comprising a word model and a character model.

9. The method of claim 8, wherein the natural language is Arabic and the language model is based at least on an Arabic language corpus.

10. The method of claim 1, wherein the receiving of the Romanized input text is from a web application and the outputting of the at least one candidate diacritized text is to the web application.

11. The method of claim 1, wherein the receiving of the Romanized input text is from a windowed application and the outputting of the at least one candidate diacritized text is to the windowed application.

12. The method of claim 1, wherein the receiving of the Romanized input text is from an input method editor and the outputting of the at least one candidate diacritized text is to the input method editor.

13. A method of inputting text into a transliteration engine, the method comprising:
receiving input text;
buffering at least some of the received input text;
detecting a first condition;
terminating the buffering based at least on the detecting of the first condition;
attempting to detect a second condition;
setting a threshold probability;
forwarding the buffered input text to the transliteration engine if the second condition is detected, wherein at least one transliteration rule is applied to the input text in response to determining that a probability that the at least one candidate transliteration rule should apply is at least equal to the threshold probability; and
recommencing buffering if the second condition is not detected.

14. The method of claim 13 wherein the detecting of the first condition comprises detecting a whitespace character in the received input text.

15. The method of claim 13 wherein the second condition comprises an indication from the transliteration engine that the transliteration engine is ready to receive input.

16. The method of claim 15 wherein the detecting of the first condition comprises receiving a notification from the transliteration engine that the transliteration engine is ready to receive input.

17. The method of claim 13, wherein the received input text is received via a tool bar.

18. A system to transliterate text, the system comprising:
a first processor,
a computer readable memory containing computer executable instructions, the instructions to perform acts that include:
receiving a Romanized input text of a natural language that comprises a native character set that includes diacritics;
selecting at least one candidate transliteration rule in response to determining that an absolute probability that the at least one candidate transliteration rule should apply is at least equal to a threshold probability;
applying each selected candidate transliteration rule to the Romanized input text to transliterate the Romanized input text into at least one corresponding candidate diacritized text in the native character set of the natural language;
computing an accuracy score for each candidate diacritized text;
ranking each candidate diacritized text based at least on the computed accuracy scores; and
outputting at least one candidate diacritized text based at least on the ranking.

19. The system of claim 18 wherein the first processor is hosted on a standalone system.

20. The system of claim 18 wherein:
the natural language is Arabic, and the transliteration model is based at least on a first corpus of text comprised of a set of Romanized Arabic texts and a second corpus of text comprised of a set of Romanized Arabic texts mapped in parallel to corresponding transliterated Arabic texts, and the first and second corpus are centrally stored on a server.

* * * * *